April 12, 1927. 1,624,888
H. J. COOK
WORK REST
Filed Aug. 11, 1925
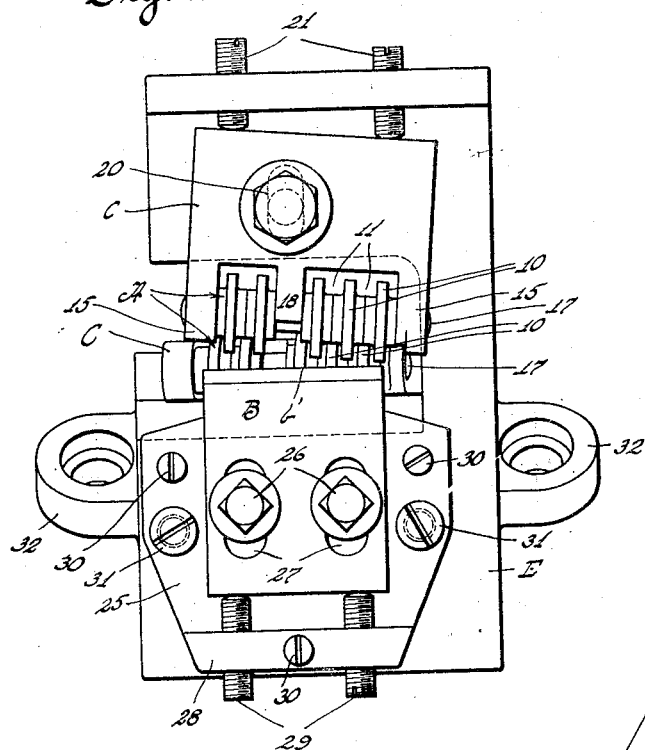
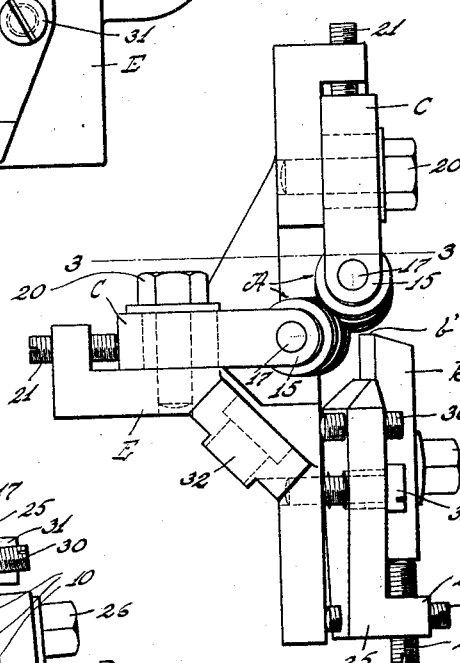
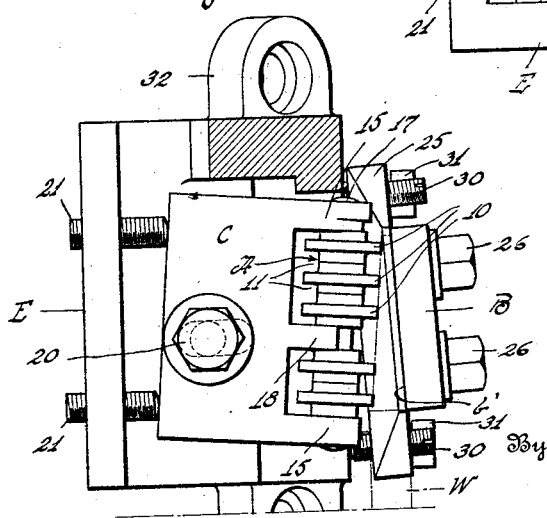
Inventor
Harris J. Cook
by
his Attorney Patented Apr. 12, 1927.

1,624,888

UNITED STATES PATENT OFFICE.

HARRIS J. COOK, OF NEW BRITAIN, CONNECTICUT, ASSIGNOR TO THE STANLEY WORKS, OF NEW BRITAIN, CONNECTICUT, A CORPORATION OF CONNECTICUT.

WORK REST.

Application filed August 11, 1925. Serial No. 49,611.

This invention relates to devices for reinforcing, supporting, or holding pieces of work while the same are operated upon as, for example, by means of a cutting tool. Devices constructed in accordance with the present invention, while susceptible of use generally as back rests for pieces of work of different kinds and sizes, and while susceptible of use in connection with machines and cutting tools of varous sorts and types, find particular application where the pieces of work are of relatively small diameter and are to be cut or turned to a taper.

In the illustrative embodiment of the invention herein disclosed, the rest includes a plurality of rollers, preferably two, arranged in opposed relation to the cutting tool, and each having circumferential work engaging ribs suitably spaced apart and with the ribs of one roller adapted to extend into the grooves between the ribs of the other one. By preference, the rollers are mounted for adjustment and each roller is preferably in the form of a plurality of sections capable of being rotated by the work at different speeds.

Among the many advantages of my improved structure may be mentioned the effectiveness with which the pieces of work operated upon are held in proper relation to the tool; the flexibility of the structure in that the rollers and the tool may be adjusted with facility to suit pieces of work of various kinds, sizes, and tapers; there is little or no binding action between the pieces of work and the rollers and between the roller sections and their bearings so that friction is reduced to a minimum, and the parts may be effectively lubricated.

Other objects will be in part obvious and in part pointed out in detail hereinafter.

The invention accordingly consists in the features of construction, combination of elements, and arrangement of parts which will be exemplified in the construction hereinafter set forth, and the scope of the application of which will be indicated in the appended claims.

In the accompanying drawings, wherein I have shown, for illustrative purposes, one of the many embodiments which the present invention may take, it being understood that this disclosure is by way of illustration only and is not to be taken as restrictive of my invention:

Figure 1 is a front view of my improved arrangement;

Fig. 2 is a side elevational view thereof; and

Fig. 3 is a sectional view taken substantially on the line 3—3 of Fig. 2, with the upper roller and its holder removed.

Referring to the drawing in detail, A, A, denote generally the rollers which support or hold the work in operative relation to the tool, the latter being designated generally by the numeral B. This tool may be of any suitable type or shape, but is here shown as comprising what is known as a box tool, it having a relatively wide cutting edge $b'$. The rollers A, A, are suitably supported in appropriate holders which may take the form of plates C C mounted for adjustment as hereinafter described more in detail.

In the present instance, each of the rollers is shown as having a plurality of spaced apart circumferential ribs 10, the peripheries of which are adapted to engage the work. The latter is shown in Fig. 3 as comprising a nail set W, one end of which is to be cut to a long taper, as illustrated. Between the ribs 10 of each roller are grooves 11. It will be noted that the ribs of one roller are alined with the grooves of the other roller and are adapted to extend into those grooves. By preference, the grooves and ribs are of such width as to permit the axes of the rollers to be inclined relative to one another in accordance with the taper to be given to the work. Furthermore, each of the rollers comprises a plurality of alined sections; that is to say, each roller is divided into a plurality of small rolls, the main object of this feature being to permit the sections to be rotated at differential speeds by the work and thereby reduce friction to a minimum.

In the drawing, the holders C, C are shown as being mounted in planes at right angles to each other on a support or base E, the construction and arrangement of which may be varied to suit the machine in which my improved rest is to be employed. Each of the holders C has a pair of ears 15 which support a pin 17 on which the sections of the respective roller A are journaled for free rotation. If desired, each of the holders may have an intermediate partial bearing 18 which serves to reinforce the central portion of the pin. The plates or holders C may be adjusted in any suitable manner; for instance, each holder may be adjusted by a pair of set screws 21 threaded in the base and engaging against the rear edge of the plate, and each holder may be clamped by bolts 20.

The tool B is preferably mounted for universal adjustment so that the edge thereof may be inclined correspondingly to the taper to be given to the work and may be brought into a plane which passes through the axis of the work. To this end, I have shown, in the present instance, the tool as being adjustably secured in place on a holder 25 by means of bolts 26 passing through elongated slots 27 in the tool and threaded into the holder 25. Extending through an outstanding lip or rib 28 on the holder are a pair of set screws 29 which engage against the lower edge of the tool. The holder 25 may be angularly adjusted to change the plane thereof by means of three set screws 30 threaded in the holder and engaging against the base E. The holder 25 is secured in place by means of screws 31 which extend freely through the holder and which are screwed into the base E. The base E may be provided with apertured ears or lugs 32 by means of which the attachment may be secured to a lathe, screw machine, or other machine of the desired type. The rest may be connected to a slide movable parallel to the axis of the work which is held by a suitable chuck, or the rest may be stationary and the work fed axially.

From the foregoing description, taken in connection with the accompanying drawing, it will be seen that the rollers A, A and the tool B may be very quickly and readily adjusted in accordance with the taper to be given to the work. When the machine is in operation, the rollers maintain the piece of work in proper relation to the tool. The rollers engage the work throughout substantially the width of the cutting edge of the tool and there is little or no binding and resultant friction between the work and the rollers and between the rollers and the pins on which they are journaled. Owing to the fact that the sections of the rollers may be brought into overlapping or intersecting relation; that is, with the ribs of one roller extending into the grooves of the other roller, the diameter of each section as compared to the diameter of the work which it engages, and the diameter of the bearing pin may be sufficiently great to avoid any cramping action therebetween. The pins 17 are of sufficient diameter to withstand the strain to which they are subjected. There is substantially no rubbing action between the work and the rollers, although different portions of the work rotate at different peripheral speeds, because each section of each roller is free to be rotated at the same peripheral speed as that of the portion of the work which it engages. The grooves between the ribs of the rollers permit of the latter being maintained in a properly lubricated condition.

It will be observed that relatively large sectional rollers may be employed without one roller interfering with the other one when turning down a small piece like a nail set or similar articles. Due to the fact that each roller has a series of relatively narrow ribs which intermesh, so as to speak, it is possible to make the ribs all of the same diameter and thus avoid trouble because of friction. Also, the roller sections may have very substantial bearings. Lubricants may very easily flow through the openings between the roller sections and onto the work, thus keeping the latter cool at all times. By using my improved structure relatively heavy cuts may be taken and faster cutting speeds may be used, which means that production costs may be materially reduced.

As many changes could be made in the above construction and many apparently widely different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A work rest having a plurality of rollers with their axes inclined relative to one another and each provided with a plurality of circumferential work engaging ribs and intervening grooves, each of said rollers comprising a plurality of independently rotatable sections, some of the ribs of one roller engaging in the grooves of the other roller.

2. A work rest having a plurality of rollers each formed of a plurality of independently rotatable sections, each roller being provided with a plurality of circumferential work engaging ribs and intervening grooves, the ribs of one roller being in intervening relation to those of another roller, and means for angularly adjusting said rollers.

3. A work rest having a plurality of holders, cooperating rollers journalled therein and each comprising a plurality of independently rotatable sections and each having a plurality of spaced work engaging ribs of like diameter, and means for angularly and radially adjusting said holders, some of the ribs of one roller extending into the grooves of the other roller.

4. A work rest having a base, holders mounted for adjustment thereon, cooperating rollers journalled therein and each comprising a plurality of sections and each having a plurality of spaced work engaging ribs, the ribs of one roller being adapted to fit in the grooves of the other one, and screws for adjusting each holder.

5. In combination, a plurality of rollers with their axes inclined relative to each other and each comprising a plurality of sections and each roller being provided with a plurality of circumferential work engaging ribs and intervening grooves, the ribs of each roller being arranged to extend into the grooves of the other, and an edge tool opposed to the rest formed by said rollers.

6. In combination, a work rest including a plurality of rollers each having a plurality of spaced ribs and each comprising a plurality of independently rotatable sections, the ribs of each roller being arranged to extend into the grooves of the other and a tool opposed to said rest.

7. In combination, a work rest including a plurality of rollers each having a plurality of spaced ribs and each comprising a plurality of independently rotatable sections, said rollers being mounted for angular adjustment in respective planes disposed at an angle to each other, and a tool opposed to said rest and mounted for universal adjustment.

HARRIS J. COOK.